(12) United States Patent
Chang (10) Patent No.: US 8,690,456 B2
(45) Date of Patent: Apr. 8, 2014

(54) UNIVERSAL MODULAR CONNECTOR (76) Inventor: Nai-Chien Chang, New Taipei (TW)

(*) Notice: Subject to any disclaimer, the term of this patent is extended or adjusted under 35 U.S.C. 154(b) by 172 days.

(21) Appl. No.: 13/475,142

(22) Filed: May 18, 2012

(65) Prior Publication Data

US 2013/0022321 A1 Jan. 24, 2013

(30) Foreign Application Priority Data

Jul. 22, 2011 (TW) .............................. 100213602 U (51) Int. Cl.
*G02B 6/36* (2006.01)
(52) U.S. Cl.
USPC .............................................. 385/89; 385/92
(58) Field of Classification Search
USPC ....................................................... 385/89, 92
See application file for complete search history.

(56) References Cited

U.S. PATENT DOCUMENTS

2011/0311187 A1* 12/2011 Wang et al. ..................... 385/78

* cited by examiner

*Primary Examiner* — Uyen Chau N Le
*Assistant Examiner* — Kajli Prince
(74) *Attorney, Agent, or Firm* — Chun-Ming Shih; HDLS IPR Services (57) ABSTRACT

A universal modular connector of the present invention mainly includes a base and a transforming module. The base has a first slot. A connecting socket is arranged in the base. The connecting socket has an opening and a plurality of conductive pins protruding out from the base. The transforming module has a circuit board, an optical component electrically connected to the circuit board, a signal transforming integrated circuit, and a plurality of conducting terminals. The transforming module is arranged in the first slot of the base. The conducting terminals are electrically connected to the conductive pins in the opening. The optical component receives an optical signal from an external wire, the signal transforming integrated circuit transforms the optical signal into a corresponding electronic signal, and then the electronic signal is transmitted to the conductive pins.

18 Claims, 6 Drawing Sheets

UNIVERSAL MODULAR CONNECTOR

BACKGROUND OF THE INVENTION

1. Field of the Invention

The invention relates to connectors, in particularly to a general connector for transferring various kinds of optical signals into electronic signals.

2. Description of Related Art

As the electronic industry growing rapidly, nowadays various kinds of electronic devices are used in our daily lives. For inputting commands to control the electronic devices, or transmitting information from one electronic device to another, at least one connector is arranged on a circuit board of the electronic device.

For example, a personal computer usually has a plurality of connectors such as universal serial bus (USB) connectors, external serial advance technology attachment (e-SATA) connectors, RJ-45 connectors, high definition multimedia interface (HDMI) connectors. With the connectors, the personal computer is capable of communicating with external controlling devices and receiving controlling commands, or the personal computer can be connected to another electronic device for mutually transmitting information.

However, as technology keeps improving, information transmission rate required by users is getting higher and higher. The traditional transmission rate of coppers wire can not meet the requirement any more. Therefore, one or more optical fiber wires with optical connector have been adopted by several kinds of novel transmission technologies for increasing the transmission rate. In practice, future connector apparatus adopting optical connector and optical fiber wire for transmitting various format signals may have a similar look of a conventional connector.

However, the above mentioned optical fiber wire can not be directly connected to a circuit board of a conventional electronic device. But some circuit board is too old to process optical signal even with an optical fiber wire installed thereon.

Furthermore, there are already several kinds of electrical connectors arranged on the circuit board. The optical connector to be arranged on the circuit board will occupy more space. Therefore, a novel connector that not only can solve the problem that the old circuit board can not process the optical signal, but no further space will be occupied by more connector.

SUMMARY OF THE INVENTION

The main objective of the present invention is to provide a universal modular connector, capable of receiving various types of optical signals, and transforming optical signals into corresponding electronic signals, and outputting electronic signals from the base.

For achieving the above mentioned objective, the universal modular connector of the present invention mainly includes a base and a transforming module. The base has a first slot. A connecting socket is arranged in the base. The connecting socket has an opening and a plurality of conductive pins protruding out from the base. The transforming module has a circuit board, an optical component electrically connected to the circuit board, a signal transforming integrated circuit, and a plurality of conducting terminals. The transforming module is arranged in the first slot of the base. The conducting terminals are electrically connected to the conductive pins in the opening.

In comparison to the related art, in order to increase the information transmission rate, traditional copper wire is replaced by optical fiber. By adopting different transforming module, the universal modular connector can connect with various kinds of external wire for receiving optical signals and transforming the optical signals into corresponding electronic signals, and transmitting the electronic signal through the base. The electronic device, such as a computer, can receive electronic signal instead of optical signal.

Therefore, the information transmission rate can be improved, and since the optical signal is transformed and then transmitted, the problem that the motherboard of the computer can not process optical signal can be solved.

DETAILED DESCRIPTION OF THE INVENTION

A detailed description of the present invention will be made with reference to the accompanying drawings.

Figure 1:
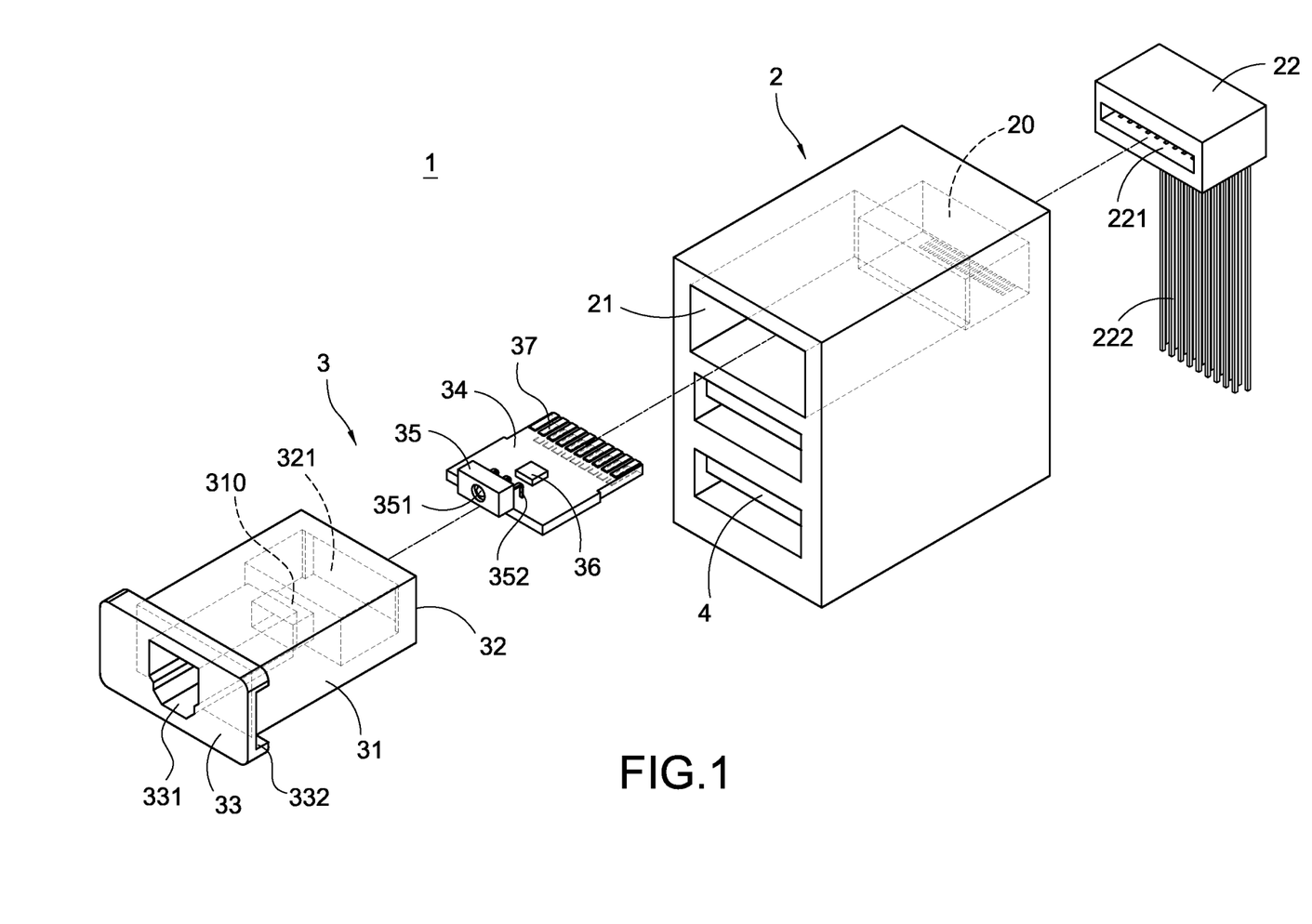
FIG. 1 is an exploded view of the first embodiment of the present invention.
Figure 2:
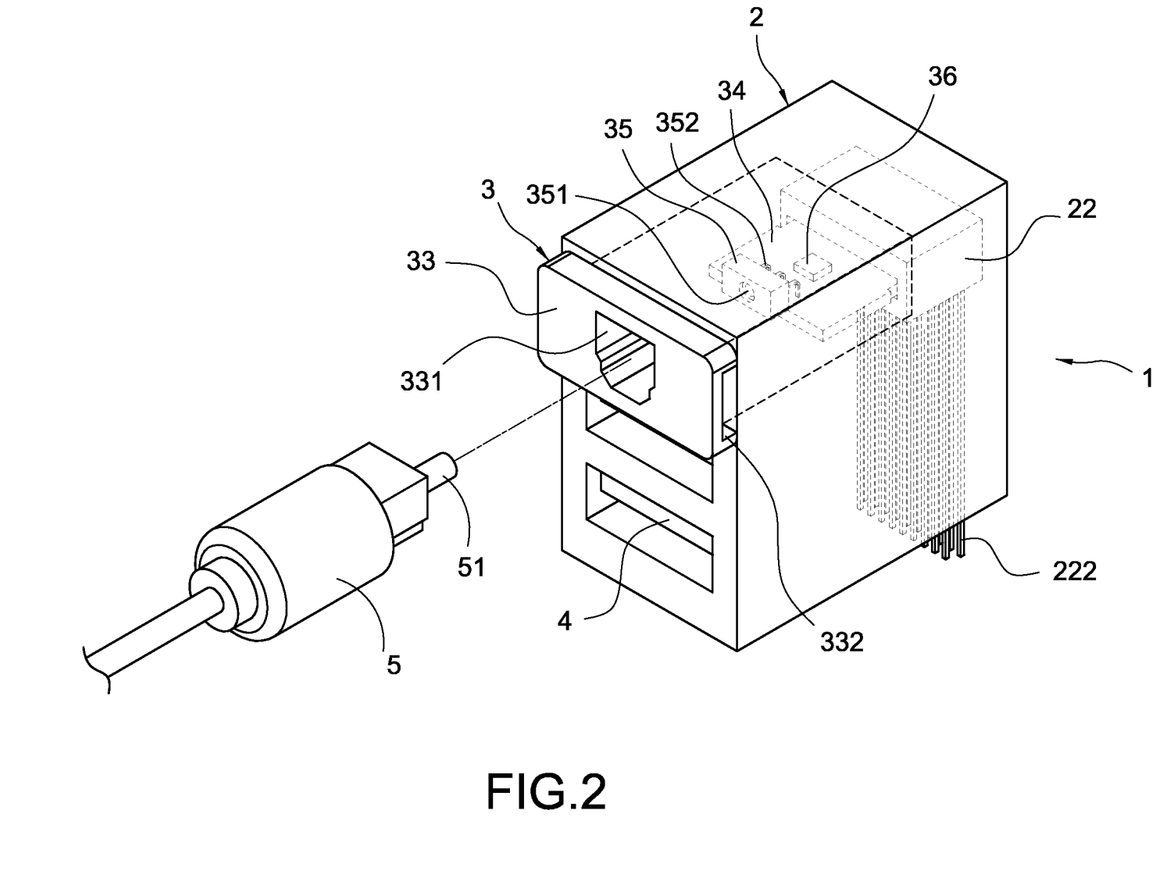
FIG. 2 is a perspective view of the first embodiment of the present invention.
Figure 3:
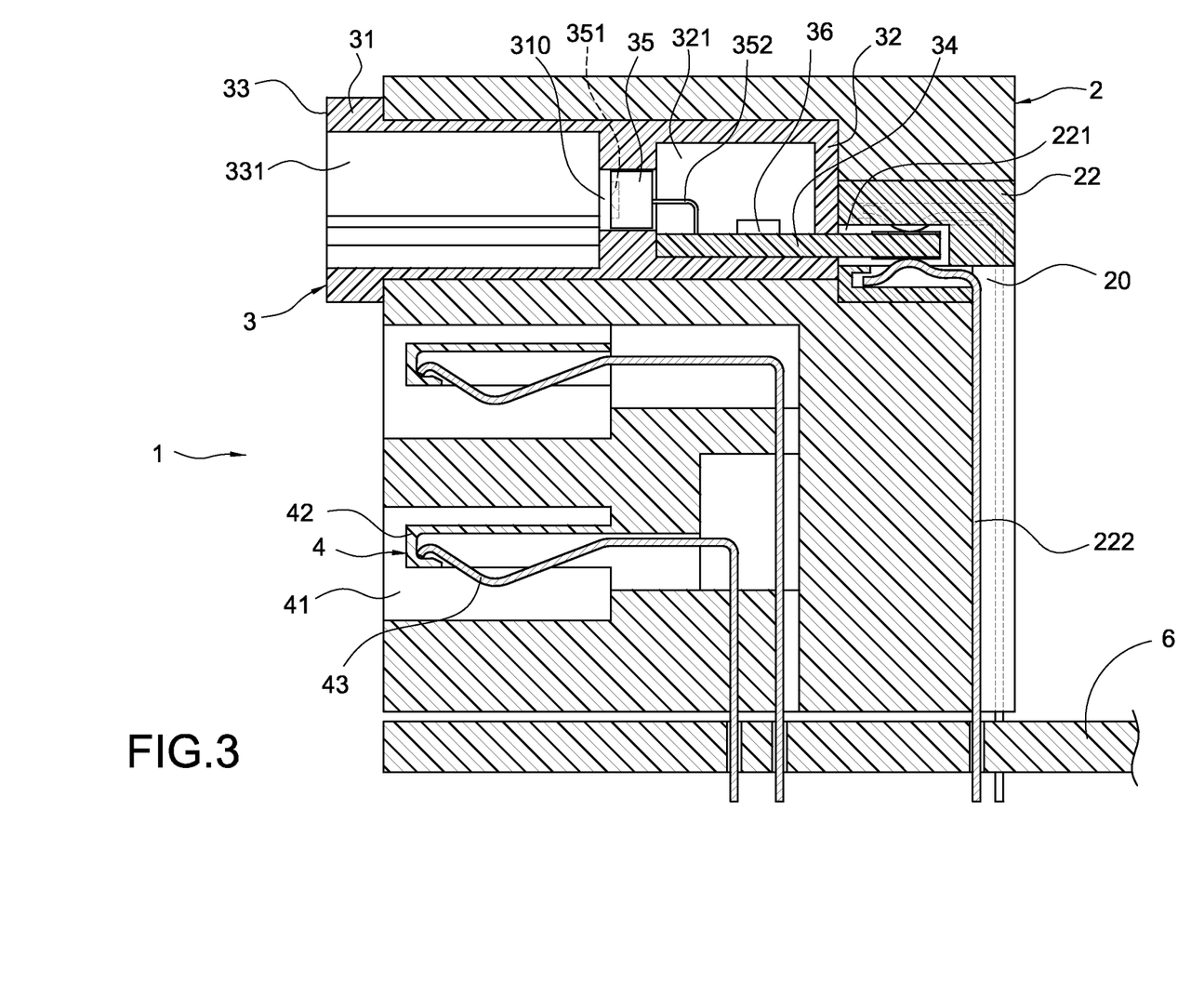
FIG. 3 is a sectional view of the first embodiment of the present invention.

FIG. 1 is an exploded view showing a universal modular connector 1 according to an embodiment of the present invention. The universal modular connector 1 mainly includes a base 2 and a transforming module 3. The base 2 is electrically connected to a motherboard 6 (as shown in FIG. 3) of an external electronic device (not shown) for electronic signal transmission with the motherboard 6. The transforming module 3 is connected to the base 2 and used for receiving a specific format electronic signal from an external transmission line 5 (as shown in FIG. 2) and transforming the electronic signal into an optical signal, and then transmitting the optical signal to the base 2. Then, the signal is transmitted from the base 2 to the motherboard 6.

The base 2 has a first slot 21 at a front end surface thereof. The base 2 defines a receiving space 20 therein. A connecting socket 22 is arranged in the receiving space 20. The connecting socket 22 has an opening 221 and a plurality of conductive pins 222 arranged in the opening 221. One ends of the conductive pins 222 are located in the opening 221, and the other ends of the conductive pins 222 protrude out from the base 2.

The transforming module 3 mainly has a shell 31, a circuit board 34, an optical component 35, a signal transforming integrated circuit 36, and a plurality of conducting terminals 37. The optical component 35, the signal transforming integrated circuit 36 and the conducting terminals 37 are electrically connected to the circuit board 34. The shell 31 mainly has an adapting end 32 and a connecting end 33 away from the adapting end 32. The adapting end 32 has an accommodating slot 321 for accommodating the circuit board 34, the optical component 35, and the signal transforming integrated circuit 36. One ends of the conducting terminals 37 on the circuit board 34 protrude out from the accommodating slot 321.

The optical component 35 mainly has an optical receiving portion 351 and a plurality of welding terminals 352 extending from the optical receiving portion 351. The optical component 35 is electrically connected to the circuit board 34 through the welding terminals 352 and used for receiving external optical signals through the optical receiving portion 351.

FIG. 2 and FIG. 3 are respectively a perspective view and a sectional view according to the first embodiment of the present invention. The adapting end 32 of the transforming module 3 is inserted into the first slot 21 of the base 2. The conducting terminals 37 of the circuit board 34 are inserted into the opening 221 of the connecting socket 22 and electrically connected to the conductive pins 222 in the opening 22.

The connecting end 33 of the shell 31 has a connecting opening 331. The connecting opening 331 of the transforming module 3 is used for connection with an external wire 5. The shell 31 has a tunnel 310 for communicating the accommodating slot 321 and the connecting opening 331. When an external wire 5 is connected to the connecting opening 331 of the transforming module 3, the optical receiving portion 351 of the optical component 35 is located corresponding to the optical connector 51 of the external wire 5. The optical receiving portion 351 can receive optical signal emitted from the optical connector 51.

The signal transforming integrated circuit 36 receives the optical signal received by the optical component 35 and transforms the optical signal into corresponding electronic signal. The format of the electronic signal is determined according to the type of the external wire 5. For example, as FIG. 2 shows, the shape of the connecting opening 331 coincides with the shape of a DisplayPort connector, so the connecting opening 331 can be connected with an external wire 5 of DisplayPort type. The optical component 35 can receive an optical signal of DisplayPort format. And the signal transforming integrated circuit 36 can transform the optical signal into an electronic signal of DisplayPort format. However, the above description is for illustration only and not limited thereto.

After the signal transforming integrated circuit 36 transforms the optical signal into electronic signal, the electronic signal will pass through the conducting terminals 37 and to the conductive pins 222. Then, the electronic signal will be further passed to the motherboard 6.

It should be mentioned that an end face of the connecting end 33 of the shell 31 is larger than the size of the first slot 21. Therefore, when the transforming module 3 is inserted in the first slot 21, the end face of the connecting end 33 will stay outside of the first slot 21. A dent 332 is formed on the end face of the connecting end 33. By exerting an external force on the dent 332 away from the base 2, the transforming module 3 can be easily pulled out from the first slot 21.

In this embodiment, more connectors 4 can be arranged below the first slot 21 of the base 2. Specifically, at least one second slot 41 can be formed under the first sot 21. A tongue portion 42 is arranged in the second slot 41. A plurality of connecting terminals 43 are arranged on the tongue portion 42. One ends of the connecting terminals 43 are located on the tongue portion 42, and the other ends of the connecting terminals 43 protrude out from the base 2 and electrically connect with the motherboard 6. The second slot 41, the tongue portion 42 and the connecting terminals 43 constitute the connector 4. In this embodiment, the connector 1 is an integrated connector which is capable of receiving optical signals as well as electronic signals.

Figure 4:
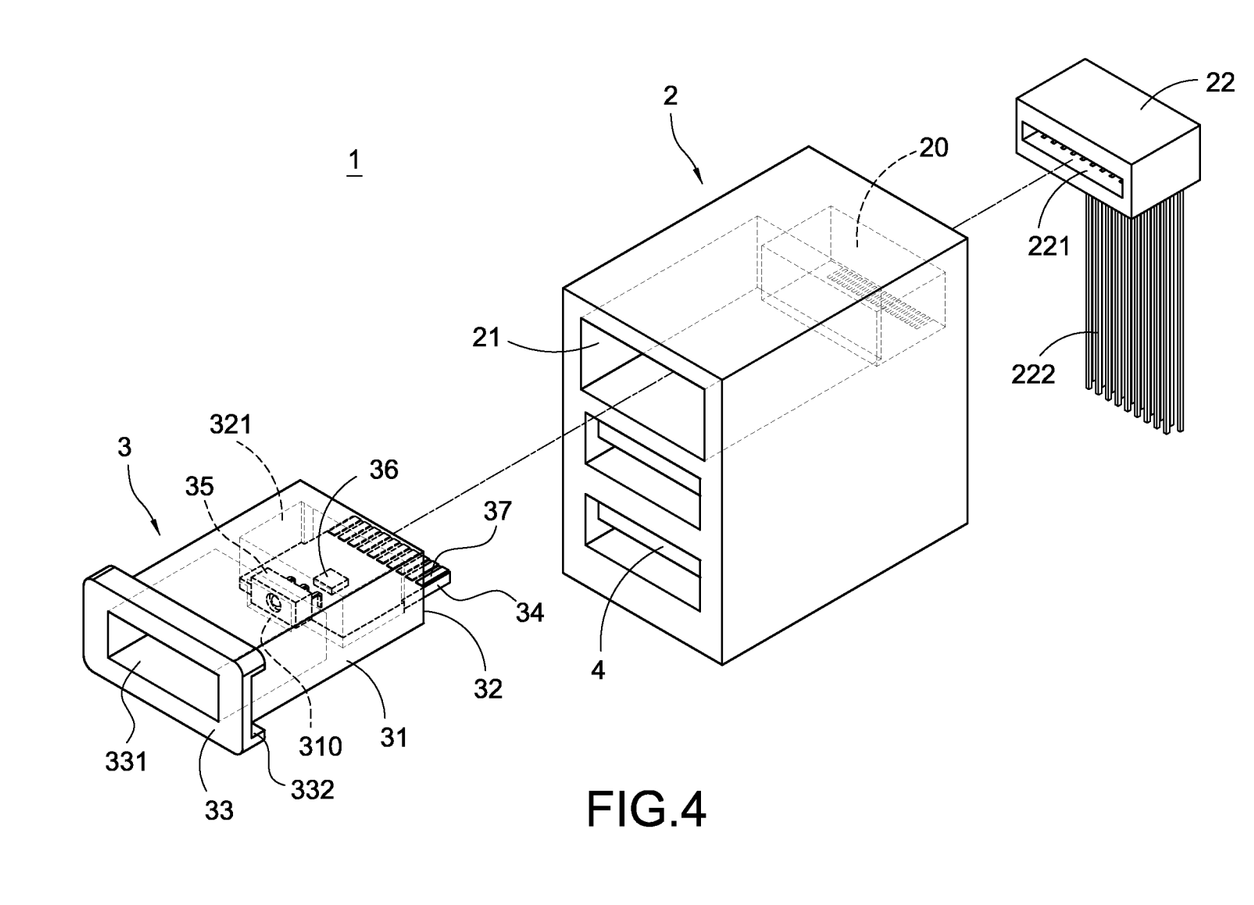
FIG. 4 is an exploded view of the second embodiment of the present invention.

FIG. 4 is a perspective view according the second embodiment of the present invention. In this embodiment, the shape of the connecting opening 331 coincides with the shape of a USB connector for connecting with a USB type external wire 5. The optical component 35 can receive a USB format optical signal through the optical receiving portion 351, and then the signal transforming integrated circuit 36 will transform the optical signal into a USB format electronic signal.

Figure 5:
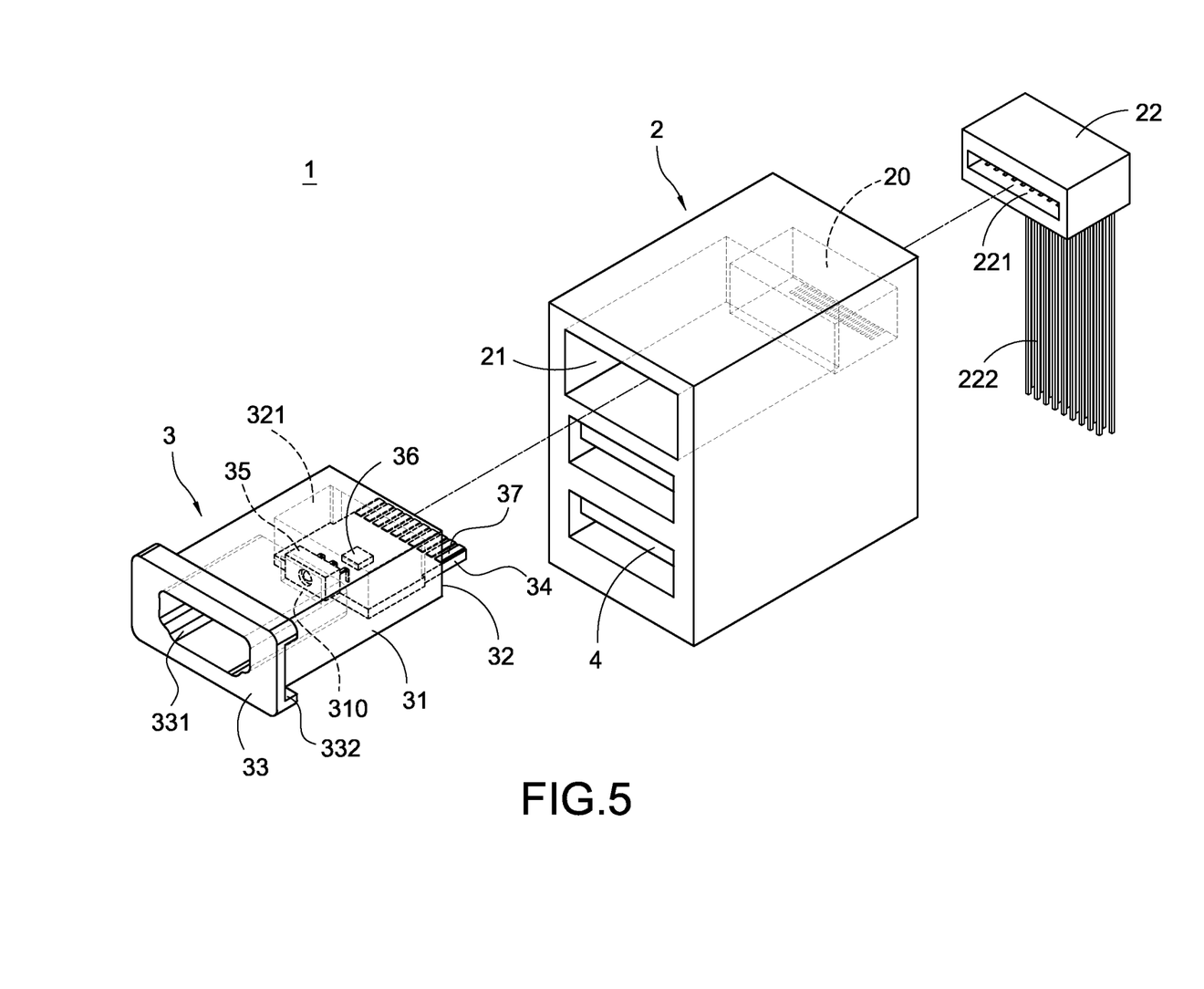
FIG. 5 is an exploded view of the third embodiment of the present invention.

FIG. 5 is a perspective view according to a third embodiment of the present invention. In this embodiment, the shape of the connecting opening 331 coincides with the shape of a high definition multimedia interface (HDMI) connector for connecting with a HDMI type external wire 5. The optical component 35 can receive a HDMI format optical signal through the optical receiving portion 351, and then the signal transforming integrated circuit 36 will transform the optical signal into a HDMI format electronic signal.

In another embodiment, the shape of the connecting opening 331 coincides with the shape of an external serial advance technology attachment (eSATA) connector for connecting with an eSATA type external wire 5. The optical component 35 can receive an eSATA format optical signal through the optical receiving portion 351, and then the signal transforming integrated circuit 36 will transform the optical signal into an eSATA format electronic signal.

Figure 6:
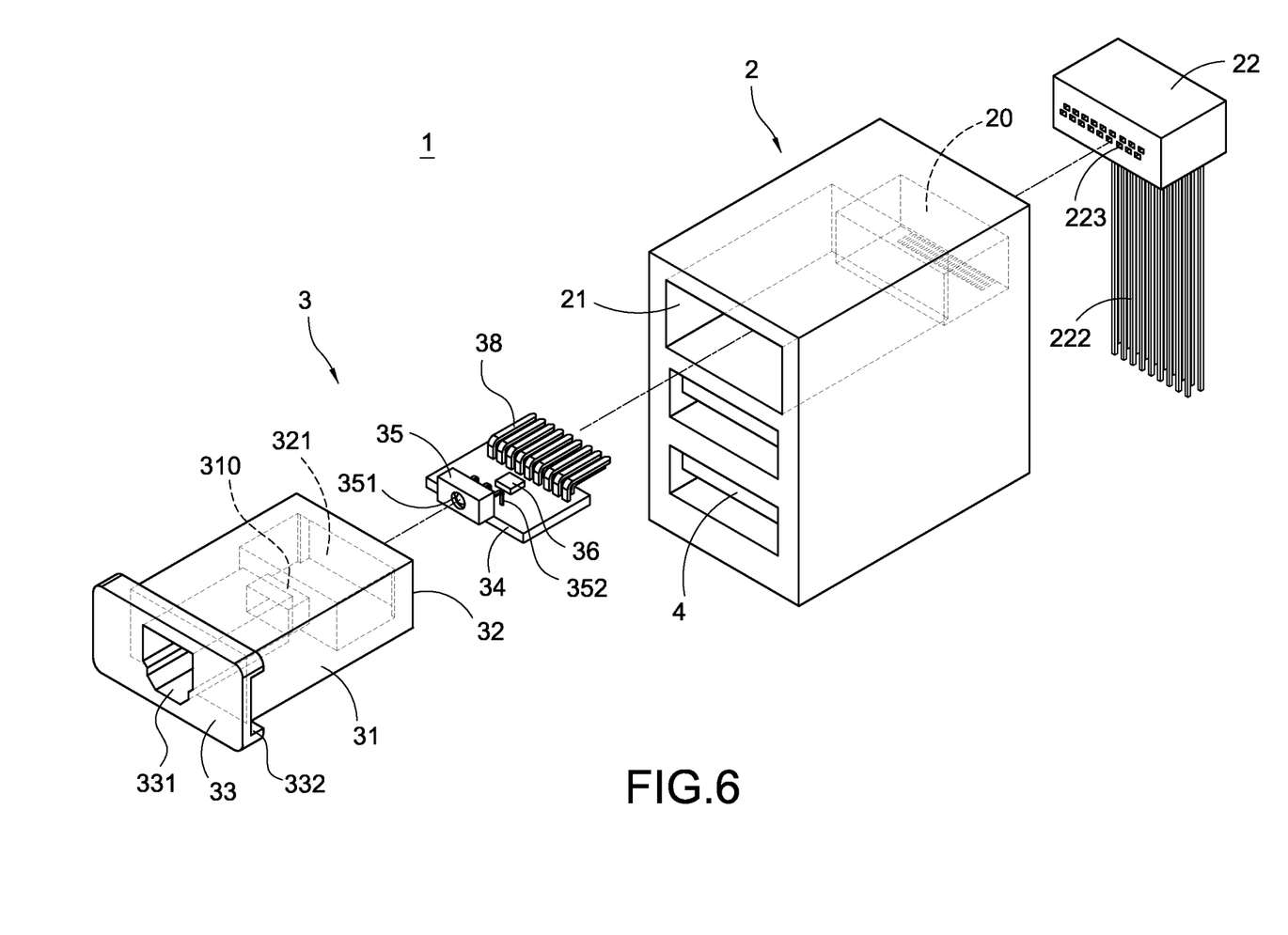
FIG. 6 is an exploded view of the fourth embodiment of the present invention.

FIG. 6 is a perspective view according to the fourth embodiment of the present invention. The difference between the present embodiment and the first embodiment is that a plurality of holes 223 are formed on the connecting socket 22 in the base 2, and a plurality of conductive pins 222 are arranged in the holes 223 and extend out from the base 2. A plurality of connecting pins 38 are adopted instead of the conducting terminals 37. The circuit board 34, the optical component 35, the signal transforming module 36 and the connecting pins 38 are located in the accommodating slot 321. One ends of the connecting pins 38 are connected to the circuit board 34, and the other ends of the connecting pins 38 protrude out from the accommodating slot 321.

In this embodiment, the transforming module 3 is arranged into the first slot 21 of the base 2 through the adapting end 32. The connecting pins 38 are inserted into the holes 223 of the connecting socket 22 and electrically connected with the conductive pins 222 in the holes 223.

When the external wire 5 is inserted into the connecting opening 331 of the transforming module 3, the optical component 35 can receive optical signal emitted from the optical connector 51, and the signal transforming integrated circuit 36 can transform the received optical signal into a corresponding electronic signal. Then, the transforming module 3 transmits the transformed electronic signal through the connecting pins 38 and to the conductive pins 222 of the base 2, and then passes through the conductive pins 222 and to the motherboard 6.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A universal modular connector for electrically connecting to the motherboard of an external electronic device, the universal modular connector comprising:

a base having a first slot and defining an receiving space;

a connecting socket arranged in the receiving space, the connecting socket having an opening and a plurality of conductive pins arranged in the opening, the conductive pins having one ends protruding out from the base for electrically connecting the base to the motherboard; and a transforming module having a circuit board, an optical component electrically connected to the circuit board, a signal transforming integrated circuit, and a plurality of conducting terminals, the optical component has an optical receiving portion and a plurality of welding terminals extending from the optical receiving portion, the optical component electrically connected to the circuit board through the welding terminals;

wherein the transforming module is arranged in the first slot, and the conducting terminals are inserted into the opening of the connecting socket and electrically connected to the conductive pins in the opening, the optical component receives an optical signal from an external wire through the optical receiving portion, and the signal transforming integrated circuit transforms the optical signal into a corresponding electronic signal, and then the electronic signal is transmitted through the conducting terminals and to the conductive pins.

2. The universal modular connector as claim 1, wherein the transforming module further has a shell, the shell has an adapting end, the adapting end of the transforming module is inserted into the first slot of the base, and the adapting end has an accommodating slot for accommodating the circuit board, the optical component, and the signal transforming integrated circuit, one ends of the conducting terminals on the circuit board protrude out from the accommodating slot.

3. The universal modular connector as claim 2, wherein the shell has a connecting end away from the adapting end, and the connecting end has a connecting opening for connection with an external wire, and the shell has a tunnel for communicating the accommodating slot and the connecting opening.

4. The universal modular connector as claim 3, wherein an end face of the connecting end of the shell is larger than the size of the first slot, and a dent is formed on the end face of the connecting end.

5. The universal modular connector as claim 3, wherein the shape of the connecting opening coincides with the shape of a DisplayPort connector, and the connecting opening is connected with an external wire of DisplayPort type, the optical component receives an optical signal of DisplayPort format, and the signal transforming integrated circuit transforms the optical signal into an electronic signal of DisplayPort format.

6. The universal modular connector as claim 3, wherein the shape of the connecting opening coincides with the shape of a USB connector for connecting with a USB type external wire, the optical component receives a USB format optical signal through the optical receiving portion, and then the signal transforming integrated circuit transforms the optical signal into a USB format electronic signal.

7. The universal modular connector as claim 3, wherein the shape of the connecting opening coincides with the shape of an external serial advance technology attachment (eSATA) connector for connecting with an eSATA type external wire, the optical component receives an eSATA format optical signal through the optical receiving portion, and then the signal transforming integrated circuit will transform the optical signal into an eSATA format electronic signal.

8. The universal modular connector as claim 3, wherein the shape of the connecting opening coincides with the shape of a high definition multimedia interface (HDMI) connector for connecting with a HDMI type external wire, the optical component receives a HDMI format optical signal through the optical receiving portion, and then the signal transforming integrated circuit will transform the optical signal into a HDMI format electronic signal.

9. The universal modular connector as claim 1, wherein at least one second slot is formed under the first slot, a tongue portion is arranged in the second slot, a plurality of connecting terminals are arranged on the tongue portion, one ends of the connecting terminals protrude out from the base and electrically connect with the motherboard; the second slot, the tongue portion and the connecting terminals constitute the connector.

10. A universal modular connector for electrically connecting to the motherboard of an external electronic device, the universal modular connector comprising:
 a base having a first slot and defining an receiving space;
 a connecting socket arranged in the receiving space, the connecting socket having an plurality of holes and a plurality of conductive pins arranged in the holes, the conductive pins having one ends protruding out from the base for electrically connecting the base to the motherboard; and
 a transforming module having a circuit board, an optical component electrically connected to the circuit board, a signal transforming integrated circuit, and a plurality of conducting terminals, the optical component has an optical receiving portion and a plurality of welding terminals extending from the optical receiving portion, the optical component electrically connected to the circuit board through the welding terminals;
 wherein the transforming module is arranged in the first slot, and the conducting terminals are inserted into the holes of the connecting socket and electrically connected to the conductive pins in the holes, the optical component receives an optical signal from an external wire through the optical receiving portion, and the signal transforming integrated circuit transforms the optical signal into a corresponding electronic signal, and then the electronic signal is transmitted through the conducting terminals and to the conductive pins.

11. The universal modular connector as claim 10, wherein the transforming module further has a shell, the shell has an adapting end, the adapting end of the transforming module is inserted into the first slot of the base, and the adapting end has an accommodating slot for accommodating the circuit board, the optical component, and the signal transforming integrated circuit, one ends of the conducting terminals on the circuit board protrude out from the accommodating slot.

12. The universal modular connector as claim 11, wherein the shell has a connecting end away from the adapting end, and the connecting end has a connecting opening for connection with an external wire, and the shell has a tunnel for communicating the accommodating slot and the connecting opening.

13. The universal modular connector as claim 12, wherein an end face of the connecting end of the shell is larger than the size of the first slot, and a dent is formed on the end face of the connecting end.

14. The universal modular connector as claim 12, wherein the shape of the connecting opening coincides with the shape of a DisplayPort connector, and the connecting opening is connected with an external wire of DisplayPort type, the optical component receives an optical signal of DisplayPort format, and the signal transforming integrated circuit transforms the optical signal into an electronic signal of DisplayPort format.

15. The universal modular connector as claim 12, wherein the shape of the connecting opening coincides with the shape of a USB connector for connecting with a USB type external wire, the optical component receives a USB format optical signal through the optical receiving portion, and then the signal transforming integrated circuit transforms the optical signal into a USB format electronic signal.

16. The universal modular connector as claim 12, wherein the shape of the connecting opening coincides with the shape of an external serial advance technology attachment (eSATA) connector for connecting with an eSATA type external wire, the optical component receives an eSATA format optical signal through the optical receiving portion, and then the signal transforming integrated circuit will transform the optical signal into an eSATA format electronic signal.

17. The universal modular connector as claim 12, wherein the shape of the connecting opening coincides with the shape of a high definition multimedia interface (HDMI) connector for connecting with a HDMI type external wire, the optical component receives a HDMI format optical signal through the optical receiving portion, and then the signal transforming integrated circuit will transform the optical signal into a HDMI format electronic signal.

18. The universal modular connector as claim 10, wherein at least one second slot is formed under the first slot, a tongue portion is arranged in the second slot, a plurality of connecting terminals are arranged on the tongue portion, one ends of the connecting terminals protrude out from the base and electrically connect with the motherboard; the second slot, the tongue portion and the connecting terminals constitute the connector.

\* \* \* \* \*